United States Patent [19]

Villoni et al.

[11] Patent Number: 5,169,180
[45] Date of Patent: Dec. 8, 1992

[54] FLUID CONDUCTING CONNECTOR ASSEMBLY WITH INSULATIVE PROPERTIES

[75] Inventors: Joseph R. Villoni, Upland; Sol R. Rubin, Beverly Hills, both of Calif.

[73] Assignee: Brass-Craft Manufacturing Company, Southfield, Mich.

[21] Appl. No.: 772,634

[22] Filed: Oct. 8, 1991

Related U.S. Application Data

[63] Continuation of Ser. No. 567,430, Aug. 14, 1990, abandoned.

[51] Int. Cl.[5] .............................. F16L 58/00
[52] U.S. Cl. ............................ 285/53; 285/55; 285/174; 285/329; 285/247; 285/354
[58] Field of Search ............... 285/48, 52, 53, 55, 285/173, 174, 329, 399, 247, 379, 354, 332.4

[56] References Cited

U.S. PATENT DOCUMENTS

| | | | |
|---|---|---|---|
| 657,372 | 9/1900 | Wiggins | 285/332.4 X |
| 697,368 | 4/1902 | Shaw | 285/379 X |
| 2,486,936 | 11/1949 | Fergus | 204/197 |
| 2,669,465 | 2/1954 | Newell | 285/53 |
| 2,726,101 | 12/1955 | Peterson | 285/52 |
| 2,740,757 | 4/1956 | Craver | 204/197 |
| 2,748,250 | 5/1956 | Andrus | 219/38 |
| 2,794,658 | 6/1957 | Purkhiser | 285/52 |
| 3,108,826 | 10/1963 | Black | 285/355 X |
| 3,167,333 | 1/1965 | Hall et al. | 285/333 X |
| 3,192,612 | 7/1965 | Elliot et al. | 138/140 |
| 3,218,096 | 11/1965 | Press | 285/354 X |
| 3,338,597 | 8/1967 | Mason | 285/52 |
| 3,542,663 | 11/1970 | Alewitz | 204/197 |
| 3,552,427 | 1/1971 | Jacobson | 137/382 |
| 3,596,931 | 8/1971 | Mishler et al. | 285/355 |
| 3,596,933 | 8/1971 | Luckenbill | 285/94 |
| 3,614,137 | 10/1971 | Jacobson | 285/390 |
| 3,660,264 | 5/1972 | Schuller | 204/197 |
| 3,718,571 | 1/1973 | Bidwell | 204/197 |
| 3,718,573 | 2/1973 | Bidwell | 204/297 |
| 3,726,548 | 4/1973 | Alewitz | 285/249 |
| 3,753,888 | 8/1973 | Alewitz | 204/197 |
| 3,811,710 | 5/1974 | Dula et al. | 285/55 |
| 3,863,963 | 2/1975 | Hershey | 285/334 |
| 3,867,274 | 2/1975 | Herman | 204/197 |
| 3,891,530 | 6/1975 | Alewitz | 204/197 |
| 4,060,472 | 11/1977 | Alewitz | 204/197 |
| 4,083,583 | 4/1978 | Volgstadt et al. | 285/55 |
| 4,216,793 | 8/1980 | Volgstadt et al. | 137/318 |
| 4,229,025 | 10/1980 | Volgstadt et al. | 285/105 |
| 4,282,175 | 8/1981 | Volgstadt et al. | 264/248 |
| 4,407,526 | 10/1983 | Cincenas | 285/27 |
| 4,487,432 | 12/1984 | Passerell et al. | 285/15 |
| 4,628,965 | 12/1986 | Passerell | 138/89 |

*Primary Examiner*—Randolph A. Reese
*Assistant Examiner*—Timothy Aberle
*Attorney, Agent, or Firm*—Edgar A. Zarins; Malcolm L. Sutherland

[57] ABSTRACT

A fluid conducting connector for use in water connections particularly water heater connectors. The connector assembly is designed for mating connection to a galvanized nipple for reduction of galvanic corrosion between dissimilar metal connections. An insulator sleeve is seated within the connector to maintain separation between the galvanized nipple and the copper tube of the assembly. The connector assembly includes an internally threaded female connector mounted to the copper tube for connection to the nipple. The insulator sleeve includes a tubular body and a radial flange. The body of the sleeve extends partially into the copper tube while the flange seats within the female connector acting as a washer for the assembly.

4 Claims, 1 Drawing Sheet

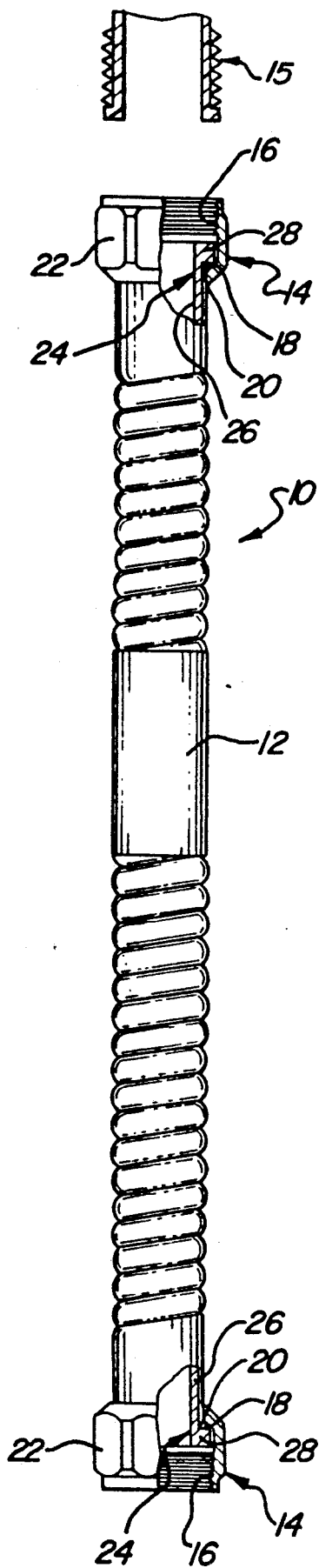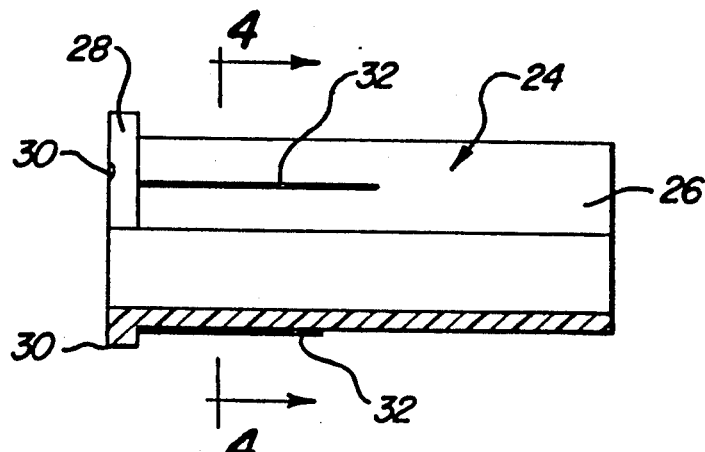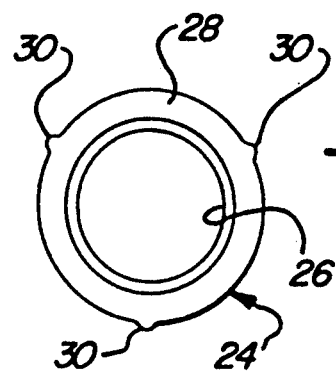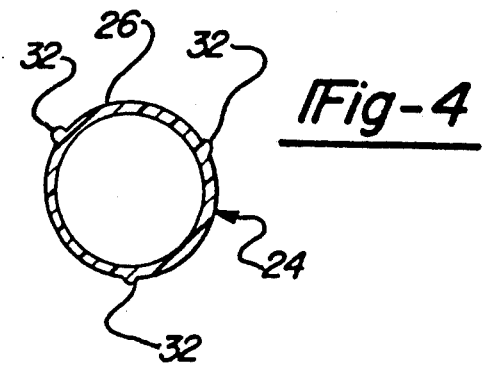

FLUID CONDUCTING CONNECTOR ASSEMBLY WITH INSULATIVE PROPERTIES

This is a continuation of Ser. No. 07/567,430 filed on Aug. 14, 1990, now abandoned.

BACKGROUND OF THE INVENTION

I. Field of the Invention

This invention relates to fluid conductors and, in particular, to a fluid conductor connector assembly which incorporates a dielectric insulator sleeve within the female connector to reduce corrosion between dissimilar metal connections.

II. Description of the Prior Art

Connectors for fluid systems such as hot water heaters often incorporate components made of dissimilar metals. One example is the copper tubing used in many connector assemblies and a galvanized female or male connector. As water flows across these components an electric current on the order of 1-2 milliamps is created depending upon the temperature and condition of the water. This galvanic action causes corrosion which can deteriorate the connector assembly and clog flow paths through the water system.

Various modifications have been made to such water systems in an attempt to reduce or eliminate galvanic corrosion. Since such corrosion results from the use of dissimilar metal components the most obvious alternative is to utilize similar materials throughout the system. However, this may not always be practical particularly when parts are added to or replaced in the existing system. Alternatively, since the corrosion is a result of the electric current flowing across the dissimilar metal components, insulators have been incorporated in the galvanized male connector or nipple which prevents contact with the tubing connected thereto. Such isolators are in the form of a sleeve with a radial flange. The sleeve portion extends into the flow passageway of the nipple while the flange sits at the opening to prevent full insertion. In the prior known sleeves the flange extends beyond the periphery of the nipple in order to create a sealing engagement between the threads of the connectors. One prior known sleeve includes a secondary flange beyond the first flange which is deformably crimped between the threads upon connection. These insulator sleeves incorporated into such male connectors provide sufficient isolation to reduce galvanic corrosion. However, the sleeves have a tendency to fall out of the connector since they are dependent upon a friction fit with the interior wall of the connector. As a result, the sleeves were made longer than necessary or incorporated crimping means to maintain their position within the connector. Moreover, it has been found that in most cases it is the tubing connector which is replaced. If the galvanized nipple has not been previously provided with an insulator sleeve because identical materials were being used, replacement of the connector can cause galvanic corrosion.

SUMMARY OF THE PRESENT INVENTION

The present invention overcomes the disadvantages of the prior known fluid connector assemblies by providing a connector with an insulator sleeve incorporated into the female connector which reduces corrosion while also acting as a sealing washer for the connection.

The fluid conducting connector assembly according to the present invention includes a tubular conductor or pipe and at least one internally threaded female connector attached to the end of the tubing. Typically, the connector is of the swivel type which allows rotation for connection without rotating the tubing. The female connector is adapted to threadably engage a male nipple upon assembly of the fluid system.

In order to isolate the male nipple from the tubing, an insulator sleeve is incorporated into the assembly. The sleeve includes a tubular body which extends at least partially into the tubing and an integrally formed radial flange which seats within the female connector. The flange is seated at the end wall of the connector to act as a washer for the connector. In a preferred embodiment, the sleeve is made of polybutylene to insulate the tubing against the galvanized nipple. In order to prevent the sleeve from inadvertently falling out of the connector, the flange is provided with three peripherally spaced projections which engage the threaded inner surface of the connector. Similarly, the tubular body includes three peripherally spaced ribs which frictionally engage the tubing to prevent removal of the sleeve.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is a perspective view partially in cross-section of a fluid conducting connector assembly embodying the present invention;

FIG. 2 is a partial cross-sectional view of the insulator sleeve incorporated into the connector assembly of the present invention;

FIG. 3 is an end view of the insulator sleeve; and

FIG. 4 is a lateral cross-sectional perspective of the insulator sleeve taken along lines 4—4 of FIG. 2.

DETAILED DESCRIPTION OF A PREFERRED EMBODIMENT OF THE PRESENT INVENTION

Referring first to FIG. 1, there is shown a fluid conducting connector assembly 10 embodying the present invention. The assembly 10 generally comprises conductor tubing 12 through which the fluid flows and having connectors 14 attached to the ends thereof for connection to a water system. In a preferred embodiment, the connectors 14 are rotatably attached to the ends of the conductor 12 to facilitate threaded connection to the water system. The conductor tubing 12 shown in the drawing is a corrugated tubing for flexibility of installation preferably made of copper.

Referring now to the drawings, the connectors 14 are of the female type with internal threads 16 formed on the cylindrical side wall. A terminal end wall 18 cooperates with a flange 20 on the tubing 12 to maintain the connectors 14 on the tubing 12 while drawing the flanged end 20 of the tubing 12 against the male connector (not shown) upon attachment. The outer surface 22 of the female connectors 14 preferably has a hexagonal configuration to facilitate attachment using a standard hand tool.

In order to reduce the corrosion resulting from dielectric conduction between the dissimilar metals of the tubing 12 and the male nipple to which the assembly 10 is attached, an insulator sleeve 24 is inserted within the tubing 12 and connector 14. The sleeve 24 is approximately two inches in length and made of polybutylene to isolate the male nipple from the tubing 12 eliminating dielectric contact. The insulator sleeve 24 has a tubular body 26 and a flat radial flange 28 integrally formed at one end of the body 26. The tubular body 26 is received within the tubing 12 while the flange 28 seats within the connector 14. As a result, fluid flow through the assembly 10 is not affected while the flange 28 of the sleeve 24 acts as a washer for the connector 14 for sealing attachment As best shown in FIGS. 2 through 4, the radial flange 28 of the insulator sleeve 24 includes a plurality of peripherally spaced projections 30 which engage the threaded interior wall 16 of the connector 14 to retard removal of the sleeve 24. Similarly, the tubular body 26 is provided with a plurality of longitudinal ribs 32 formed on the exterior surface thereof. The ribs 32 create a friction fit with the tubing 12 to retard removal. Thus, both the projections 30 and the ribs 32 prevent the sleeve 24 from inadvertently falling out of the conductor assembly 10.

The present invention provides a simple and inexpensive means of reducing galvanic corrosion as a result of dielectric conduction between dissimilar metals of a water connector assembly. The insulator sleeve 24 is received within the female connectors 14 to isolate the galvanized male nipple from the copper tubing 12 of the assembly 10 while also acting as the sealing washer for the female connector 14.

The foregoing detailed description has been given for clearness of understanding only and no unnecessary limitations should be understood therefrom as some modifications will be obvious to those skilled in the art without departing from the scope and spirit of the appended claims.

What is claimed is:

1. A fluid conducting connector for connection to an externally threaded nipple, said connector assembly comprising:

a tubular conductor forming a fluid passageway;

an internally threaded female connector attached to and in contact with at least one end of said conductor, said female connector selectively threadably attaching to the externally threaded nipple; and an integrally formed one-piece insulator sleeve having a tubular body and a flat integral radial washer flange extending outwardly from said tubular body, said radial flange including a plurality of integral projections extending radially outwardly from said flange and engaging said internally threaded female connector and said tubular body including a plurality of longitudinal ribs integrally formed on the outer surface of said tubular body and engaging said tubular conductor, said projections and said ribs preventing inadvertent withdrawal of said insulator sleeve from said connector assembly;

said insulator sleeve received within said conductor and connector such that said tubular body extends at least partially into said tubular conductor a length sufficient to prevent dielectric conduction within said fluid passageway, said insulator sleeve spanning said attachment of said female connector to said tubular conductor to prevent conductive contact of fluid within the connector assembly between said connector assembly and the threaded nipple and said radial washer flange seats within said female connector to maintain sealing separation between said tubular conductor and the threaded nipple, whereby said insulator sleeve forms a fluid passageway to conduct fluid past said female connector into said tubular conductor reducing galvanic corrosion within said connector assembly by preventing dielectric conductors between the threaded nipple, said female connector and said tubular conductor.

2. The connector assembly as defined in claim 1 wherein said insulator sleeve is made of polybutylene.

3. In a fluid conducting connector assembly having a copper tubular conductor and an internally threaded female connector attached to and in contact with at least one end of the copper tubular conductor, the female connector selectively threadably connecting to an externally threaded galvanized nipple for conducting fluid, the improvement comprising:

an integrally formed insulator sleeve having a tubular body and a flat integral radial washer flange extending outwardly from said tubular body, said sleeve positioned within said connector assembly forming a fluid passageway to conduct fluid past said connector and nipple into said conductor and maintaining separation between the galvanized threaded nipple and the copper tubular conductor such that said tubular body extends at least partially into the tubular conductor a length sufficient to form a dielectric fluid passageway into the tubular conductor and said radial flange seats within the female connector to maintain sealing separation between the tubular conductor and the threaded nipple thereby reducing galvanic corrosion by separating the galvanized nipple from the copper tubular conductor and preventing fluid conductivity between the nipple and tubular conductor while allowing fluid flow therethrough, said radial flange including a plurality of integral projections extending radially outward therefrom to engage the internally threaded female connector and said tubular body including a plurality of integral exterior ribs engaging an inner surface of the tubular conductor, said projections and ribs preventing inadvertent withdrawal of said insulator sleeve from the connector assembly.

4. A fluid conducting connector assembly for connection to an externally threaded nipple, said connector assembly comprising:

a tubular conductor forming a fluid passageway;

an internally threaded female connector attached to and in contact with at least one end of said conductor, said female connector selectively threadably attaching to the externally threaded nipple; and an integrally formed one-piece insulator sleeve having a tubular and a flat integral radial washer flange extending outwardly from said tubular body, said radial flange including three circumferentially spaced integral projections extending radially outwardly from said flange and engaging an inner surface of said internally threaded female connector and said tubular body including three circumferentially spaced longitudinal ribs integrally formed on the outer surface of said tubular body and engaging an inner surface of said tubular conductor, said projections and said ribs preventing inadvertent withdrawal of said insulator sleeve from said connector assembly;

said insulator sleeve received within said conductor and connector such that said tubular body extends at least partially into said tubular conductor to fluidly isolate said tubular conductor from the nipple preventing dielectric conduction therebetween, said insulator sleeve spanning said attachment of said female connector to said tubular conductor to prevent conductive contact of fluid within the connector assembly and the threaded nipple and said radial washer flange seats within said female connector to maintain sealing separation between said tubular conductor and the threaded nipple whereby said insulator sleeve forms a fluid passageway to conduct fluid past said female connector partially into said tubular conductor reducing galvanic corrosion within said connector assembly by preventing dielectric conduction between the threaded nipple, said female connector and said tubular conductor.

* * * * *